March 30, 1937.  J. E. RAMSBOTTOM ET AL  2,075,658
ICE PREVENTING DEVICE
Filed March 26, 1935  2 Sheets-Sheet 1
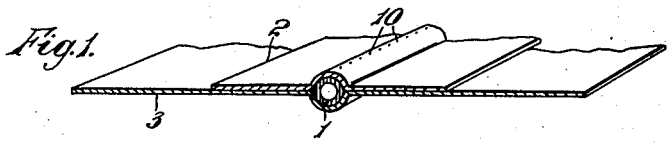
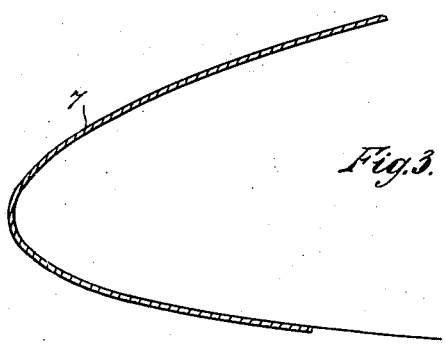
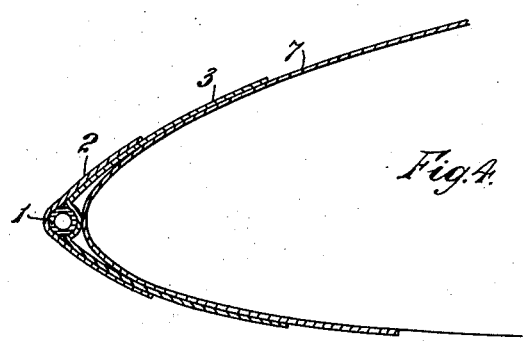
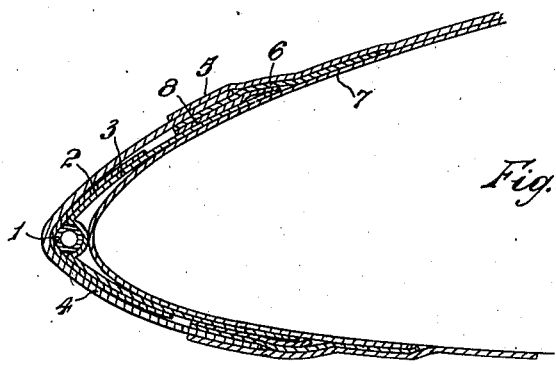

March 30, 1937.  J. E. RAMSBOTTOM ET AL  2,075,658
ICE PREVENTING DEVICE
Filed March 26, 1935  2 Sheets-Sheet 2
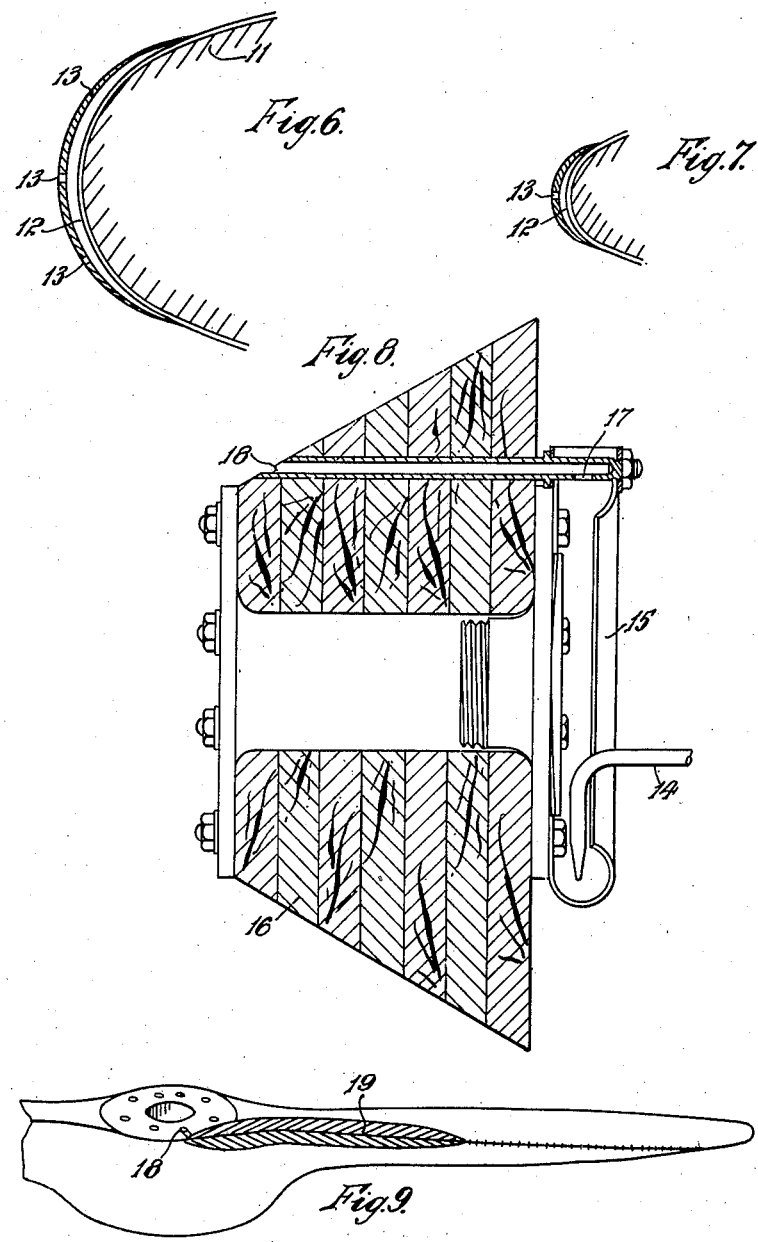

Patented Mar. 30, 1937

2,075,658

UNITED STATES PATENT OFFICE 2,075,658

ICE PREVENTING DEVICE

John Edwin Ramsbottom, Benny Lockspeiser, and Charles John Stewart, Farnborough, England Application March 26, 1935, Serial No. 13,050
In Great Britain April 7, 1934

8 Claims. (Cl. 244—134)

This invention relates to a method and apparatus for preventing the accretion of ice and snow upon the wings, struts, airscrews or other parts of aircraft, motor cars or other craft or vehicles.

The invention will be described in its application to the above purpose in aircraft, the safety and performance of which are by the nature of the vehicle and its supporting medium peculiarly susceptible to any uncontrolled increase in drag or load, loss of balance, or propulsive efficiency.

Such adverse and dangerous effects when produced by ice are also accompanied by a decrease in lifting power and an increase in wind resistance, both of which tend to cause loss of speed, and forced landings by reducing the height normally attainable by the aircraft as for instance when flying over mountainous country or territories even in equatorial regions.

The object of the present invention is to overcome these difficulties in a controllable and economical manner, whereby flights through clouds and in particular at varying altitudes and differing temperatures may be performed with a greater assurance of safety by preventing the formation of ice where it would quickly collect in flying.

The invention not only aims at preventing the formation of ice upon the surface of the aircraft, but also provides means to enable an occupant of the aircraft to weaken the hold of any ice which has formed so that it may break and fall or be blown away before it attains sufficient thickness to affect the performance or attitude of the aircraft or its controls.

According to this invention the method of developing protective films upon the surfaces of aircraft and other vehicles is characterized by distributing a liquid through the leading portions of the said surfaces during transit which contains a substance preventing the accretion and adhesion of ice or snow, the said substance or substances lowering the freezing point of water and being soluble therein.

The method is also characterized in that the said film or films flow out upon the said portions from or through one or more bodies of, or containing the liquid or liquefiable substance which are positioned upon or within the leading edges or faces of the said surface portions, that is to say especially those commonly known in aeronautical science as "the surfaces of entry".

In the preferred form of carrying out the invention the film forming substance which lowers the freezing point of water is initially a liquid, which may for example, consist of or comprise an organic liquid such as ethylene glycol, or glycerine, or may consist of solutions of inorganic compounds having no deleterious effect on the structural material of the aircraft and which solidify below the freezing point of water and such liquids or solutions may, if desired, contain colloidal ingredients and a wetting agent or agents such as a soap or a complex sulphonate of an organic material.

The liquids or solutions described above may be expelled when required from a container connected by a pipe to a hand pump or to a source of initially compressed air or fluid which may be released as required through a suitable reduction valve to expel the liquid at variable pressure through the wings or other parts to be protected.

The pump or container may be connected to a number of pipes leading to the leading edges or faces of wings, struts, airscrews and other parts to be protected, and these pipes are connected to perforated, slotted, or permeable porous tubes or chambers through which their liquid content may be distributed or diffused over the areas to be protected.

Such tubes or chambers when fitted along or within the leading edges of wings and other parts may be of cylindrical or other cross-section, but where fitted externally to such surfaces, the tubes or chambers are preferably housed or shaped to preserve or complete the streamline contour of the part to which they are secured.

The rate of efflux from the tubes or chambers is then controlled by varying the pressure on the liquid in the container as above described or if desired the efflux may also be regulated by covering the holes or slots in the tubes or chambers with porous material such as leather or rubber, or with fabric of suitable mesh.

The perforated or slotted tubes or chambers may be attached to the leading edge by clips or by fabric or other similar material secured in position by an adhesive, by lacing or other means.

Where such tubes or chambers are fitted externally at intervals, filling materials which may be in the form of paste may be used temporarily or permanently to complete the streamline contour in the intervening portions between the chambers.

As an alternative to carrying a supply of anti-freezing substance which is initially in the preferred liquid form, we may provide such substance or a patent substance or substances therefor in non-liquid or solid form as for instance in the form of an initially dry solid which is wholly or in part soluble by atmospheric moisture, whereby an aqueous solution of the anti-freezing substance is automatically formed to spread in a film over the part or parts to be protected during transit.

Such non-liquid substance may also be of such a nature that it is readily moulded to any desired shape and can be applied in various thicknesses to suit the conditions and duration of flight anticipated.

A suitable mixture for the non-liquid mouldable substance is sodium chloride and fish or other glue in the ratio of two parts to one by weight.

Alternatively a mixture of calcium chloride or sugar may be used with glue, gelatin or agar.

Where the constituent proportions of such non-liquid substance are such that the substance is mechanically unstable and requires support, then we place it between a tensioned or elastic outer covering of porous material or having openings of porous material and an inner lining preferably of waterproof material such as a ply or plies of rubberized fabric which protects the surface of the aircraft from the fluid liberated from the substance in transit.

The outer covering constituting the leading edge which is preferably of absorbent material to prevent undue disintegration of the water soluble layer beneath may be stiffened by vertically or laterally, extending webs or ribs to preserve the streamline contour.

In order that the invention may be more readily understood and carried into effect, the same will now be described with reference to the following drawings in which:—

Fig. 1 is a part perspective end elevation of the inner portion of a deicer, prior to attachment to the wing of an aircraft.

Fig. 2 is a sectional end view of the outer portion of a deicer prior to attachment to the wing of an aircraft.

Fig. 3 is a part sectional end view of the surface of entry of an aircraft wing of comparatively thin section.

Fig. 4 is a part sectional end view showing the assembly upon the wing shown in Fig. 3 of the inner portion of the deicer shown in Fig. 1.

Fig. 5 is a part sectional view showing the complete assembly of the inner and outer portions of the deicer upon an aircraft wing such as is shown in Fig. 3.

Figs. 6 and 7 are part sectional side elevations of part of the assembly of a deicer suitable for the root and tip portions of a wing of thicker cross section.

Fig. 8 is a part sectional side elevation of an airscrew boss and means whereby the blades of the screws are supplied with deicing liquid.

Fig. 9 is a part perspective view of an airscrew and means for introducing the liquid film to the surface thereof.

It will be understood that the relative thicknesses of the fabric layers shown in the drawings have been somewhat exaggerated for the sake of clearness.

Referring to Fig. 1, a rubber tube 1 of internal diameter of the order of one eighth of an inch and external diameter of one quarter of an inch is positioned between two rubberized plies of fabric 2 and 3 to which the tube may be secured by a rubber cement.

The rubberized fabric plies may be single plies, the ply 2 being about two inches wide and the ply 3 being about four and a half inches wide.

The outer portion of the deicer assembly shown in Fig. 2 comprises a strip of permeable absorbent material such as leather of about four inches in width.

The leather selected should be smooth, free from wrinkles and uneven places, and of a thickness of between 0.4 and 0.5 millimetre which should not vary by more than ten per cent.

Joints if any should be carefully made so as to leave no stop or depression and to leave a smooth surface of uniform flexibility and thickness. Two strips 6 of rubberized single ply fabric about two inches wide are secured by rubber cement in contact with the leather, the joints so formed being then interposed between two pairs of fabric strips, the two uppermost shown at 5 being about six inches wide and the under strips 8 being about three inches in width.

The leather 4 is sewn to the strips 5 and 6 by stitches 9 which are protected from abrasion when secured to the wing by the fabric strips 8.

A strip of rubberized fabric 7 is then secured by adhesive to the surface of entry of the wing shown in Fig. 3 and the assembly shown and described with reference to Fig. 1 is fixed thereto so that the tube 1 coincides with the extreme edge of the surface of entry.

Before superimposing the parts shown in Fig. 2 the tube 1 is filled with ethylene glycol at a pressure of 20 pounds per square inch and the tube is pierced by means of a needle so as to provide a series of holes 10 Fig. 1 about one quarter of an inch apart.

It will be understood that the axes of the holes in the tube 1 are made so that they are on the front side of the tube and are substantially coincident with the line of flight.

As the flow is comparatively small the tube may be of uniform bore but the holes made therein are preferably made so that they act like valves which remain closed until a certain pressure is reached.

Valvular holes suitable for this purpose may be made by a needle of equal sided triangular cross-section and about three inches in length tapering from a base of which the three sides are each about 0.7 inch long.

The three cutting edges thus form three cuts intersecting at angles of 120°, the length of each leg of the cut being determined by a stop on the needle which may be set at $\frac{3}{32}$ of an inch from its point.

After removing any ethylene glycol from the outer surface of the deicer parts so far assembled as shown in Fig. 4, the remaining portion of the assembly Fig. 2 is then superposed to constitute the complete assembly as shown in Fig. 5 so as to compress the tube.

The rubberized fabric strips 6 are secured by rubber cement and the fabric strips 5 are then secured to the wing by the usual aeroplane dope and varnish in accordance with the colour scheme required.

Figs. 6 and 7 show a similar arrangement for wings having comparatively deep or thick surfaces of entry which taper from the root portion Fig. 6 adjacent the fuselage to thin portions remote therefrom, Fig. 7.

In this modification the surface of entry of the root portion 11 of the wing is faced with a moulded rubber cap of diminishing section constituting a chamber or chambers 12 having a series of holes 13, one series of which may be pierced through the cap along its centre line and others above and below.

As the section of the wing tapers to the tip section shown in Fig. 7 the three series of holes may be reduced to two and finally to one series.

In Fig. 8 the non-freezing film forming fluid is led by a stationary main feed pipe 14 to a circular annulus 15 of channel shaped cross section which is secured to and rotates with the boss 16 of the airscrew, the blades of which are shown in Fig. 9 and the nozzle of the pipe may be adjusted in dimension to permit the required flow of liquid under gravity from a suitable tank.

The liquid retained in the annulus by centrifugal force passes through a slot 17 into a conduit which may conveniently take the form of a hollow bolt 18 whence it is fed in under a leather strip 19 Fig. 9 at the root of each blade.

The leather strip 19 is not stuck to the blade along its central portion overlying the leading edge except at the end remote from the root, but only along the blade surfaces on each side of the leading edge of the blade so that the liquid is induced to percolate by centrifugal force through and beneath the leather along the convex leading edge of the blade.

We have found that when the leather strips on the airscrew become wetted by atmospheric moisture they tend to pucker under centrifugal force and that this tendency may be prevented by an open mesh covering of wire gauze.

Having now particularly described our said invention, we claim:—

1. Apparatus for protecting aircraft from ice accumulations, which comprises a supply of ice-preventing fluid, a covering permeable to said fluid on the surface to be protected from ice formation and means for supplying said fluid from said supply to the inner surface of said covering.

2. Apparatus for protecting aircraft surfaces from ice formation, which comprises a supply of ice-preventing fluid, a covering permeable to said fluid on the surfaces to be protected from ice formation and means comprising valvular apertures for supplying said fluid from said supply and distributing it to the undersurface of said covering.

3. Apparatus for protecting aircraft surfaces from ice formation, which comprises a covering for said surfaces permeable to an ice-preventing fluid and means comprising an apertured tube for supplying and distributing an ice-preventing fluid to the inner surface of said covering.

4. Apparatus for protecting aircraft surfaces from ice formation, which comprises a covering of leather to an ice-preventing liquid and a rubber tube having small apertures opened by the pressure of fluid in said tube to deliver said ice-preventing fluid to the inner surface of said covering at distributed areas thereof.

5. Apparatus for protecting aircraft surfaces from ice formation, which comprises a tube lengthwise of the leading edge of the surface to be protected, a covering permeable to ice-preventing fluid extending over said tube and covering the surface to be protected, said tube having openings at lengthwise intervals to said fabric and means to supply an ice-preventing liquid through said tube to said fabric.

6. Apparatus for protecting aircraft surfaces from ice formation which comprises a member having a passageway lengthwise of the leading edge of the surface to be protected, a covering permeable to an ice-preventing fluid extending over said passageway and over the surface to be protected, said passageway having openings to deliver liquid therefrom to the inner surface of said covering and means to supply an ice-preventing liquid through said passageway to said openings.

7. Apparatus for protecting the leading portion of an aircraft surface from ice formation which comprises a tubular member extending lengthwise of and at said leading portion, a cover of material permeable to ice-preventing fluid extending over said tubular member and covering the surface to be protected, said tubular member having apertures therein in contact with one side of said permeable material, and means to supply an ice-preventing liquid through said tubular member to said material whereby the formation of ice on said leading portion is prevented.

8. Apparatus for protecting aircraft surfaces from ice accumulation, which comprises means forming a source of supply of ice-preventing fluid, an absorbent covering material permeable to said fluid on the surface to be protected from ice accumulation and means for conveying said fluid from said first mentioned means to the inner surface of said covering.

JOHN EDWIN RAMSBOTTOM.
BENNY LOCKSPEISER.
CHARLES JOHN STEWART.